(12) United States Patent
Takishima et al.

(10) Patent No.: US 6,292,447 B1
(45) Date of Patent: Sep. 18, 2001

(54) HEAD FOR OPTICAL DISC DRIVE

(75) Inventors: Suguru Takishima, Tokyo; Hiroshi Nishikawa, Saitama-ken, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/177,568

(22) Filed: Oct. 23, 1998

(30) Foreign Application Priority Data

Oct. 24, 1997 (JP) .................................. 9-309864
Oct. 24, 1997 (JP) .................................. 9-309865

(51) Int. Cl.$^7$ .................. G11B 3/90; G11B 7/00
(52) U.S. Cl. ............. 369/53.25; 369/44.23; 369/119; 369/120
(58) Field of Search .............. 369/44.17, 44.19, 369/44.21, 44.22, 44.23, 44.24, 44.41, 53.25, 53.26, 53.28, 112.01, 112.29, 112.23, 112.24, 118, 119, 120

(56) References Cited

U.S. PATENT DOCUMENTS

| 2,750,461 | 6/1956 | Bunch . |
| 3,244,917 | 4/1966 | Gute . |

(List continued on next page.)

FOREIGN PATENT DOCUMENTS

| 0084727 | 8/1983 | (EP) . |
| 0084728 | 8/1983 | (EP) . |
| 0448362 | 9/1991 | (EP) . |
| 0790512 | 8/1997 | (EP) . |
| 0907163 | 4/1999 | (EP) . |
| 378922 | 8/1932 | (GB) . |
| 1314002 | 4/1973 | (GB) . |
| 1457995 | 12/1976 | (GB) . |
| 2000604 | 1/1979 | (GB) . |
| 2086092 | 5/1982 | (GB) . |
| 2193341 | 2/1988 | (GB) . |
| 62262017 | 11/1987 | (JP) . |
| 64-2015 | 1/1989 | (JP) . |
| 5128561 | 5/1993 | (JP) . |
| 8315404 | 11/1996 | (JP) . |
| 90/08363 | 7/1990 | (WO) . |
| 98/06095 | 2/1998 | (WO) . |
| 98/49675 | 11/1998 | (WO) . |
| 98/49684 | 11/1998 | (WO) . |

OTHER PUBLICATIONS

Patent Abstracts of Japan, vol. 012, No. 140 (P–696), dated Apr. 18, 1988.

(List continued on next page.)

*Primary Examiner*—Paul W. Huber
(74) *Attorney, Agent, or Firm*—Greenblum & Bernstein, P.L.C.

(57) ABSTRACT

Disclosed is a head of an optical data recording and/or reproducing device. The head is provided with a laser source, an objective optical system, a deflector for deflecting the laser beam emitted by the laser source towards the objective optical system. A relay optical system provided between the deflector and the objective optical system. Further, a detector is provided between the deflector and the relay optical system. The detector has a first and a second light receiving portions and an opening. The two light receiving portions are arranged in a first direction in which the laser beam is deflected by the deflector. A part of the laser beam incident on the detector is received by the first and second light receiving portions, the other passes through the opening. An amount of rotation of the deflector is detected in accordance with amounts of light received by the two light receiving portions.

12 Claims, 7 Drawing Sheets

U.S. PATENT DOCUMENTS

| | | |
|---|---|---|
| 3,354,833 | 11/1967 | Laing . |
| 4,088,914 | 5/1978 | Aoki . |
| 4,126,796 | 11/1978 | Ito . |
| 4,206,379 | 6/1980 | Owida . |
| 4,285,566 | 8/1981 | Yamamoto . |
| 4,297,713 | 10/1981 | Ichikawa et al. . |
| 4,351,596 | 9/1982 | Ohniwa et al. . |
| 4,466,088 | 8/1984 | Trethewey . |
| 4,891,998 | 1/1990 | Tourville . |
| 4,959,824 | 9/1990 | Ueda . |
| 4,968,876 | 11/1990 | Iima . |
| 5,125,750 | 6/1992 | Corle et al. . |
| 5,126,899 | 6/1992 | Kanazawa et al. . |
| 5,136,559 | 8/1992 | Nakayama . |
| 5,151,890 | 9/1992 | Yonekubo . |
| 5,220,550 | 6/1993 | Nakayama . |
| 5,254,893 | 10/1993 | Ide . |
| 5,365,504 | 11/1994 | Noguchi . |
| 5,420,848 | 5/1995 | Date et al. . |
| 5,422,872 | 6/1995 | Hsu et al. . |
| 5,444,683 | 8/1995 | Ishikawa . |
| 5,461,498 | 10/1995 | Iwao . |
| 5,517,474 | 5/1996 | Takamine . |
| 5,532,480 | 7/1996 | Scofield . |
| 5,564,585 | 10/1996 | Saitoh . |
| 5,596,446 | 1/1997 | Plesko . |
| 5,608,280 | 3/1997 | Tamemoto et al. . |
| 5,610,752 | 3/1997 | Hayakawa . |
| 5,625,244 | 4/1997 | Bradfield . |
| 5,684,762 | 11/1997 | Kubo . |
| 5,705,868 | 1/1998 | Cox et al. . |
| 5,719,834 | 2/1998 | Futagawa et al. . |
| 5,764,613 | 6/1998 | Yamamoto . |
| 5,768,241 | 6/1998 | Kanazawa et al. . |
| 5,844,676 | 12/1998 | Southam et al. . |
| 5,886,438 | 3/1999 | Kawanishi . |
| 5,920,140 | 7/1999 | Nakagishi et al. . |

OTHER PUBLICATIONS

Patent Abstracts of Japan, vol. 017, No. 505 (P–1611), dated Sep. 10, 1993.

An article entitled "Optical Magnetic Disk Device OfU.S. TeraStor Succeeds Tracking Control—Track Pitch Of 0.34 μm Realized Using Two–Stage Servo", which appeared at pages 13 and 14 of the Japanese language magazine *Nikkei Electronics*, Sep 22, 1997 (No. 699).

An article entitled "Trillions Of Bytes", by Eric Nee, which appeared in the Mar. 24, 1997 issue of Forbes magazine.

A screen capture of a page from TeraStor's website (dated MAr. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

HEAD FOR OPTICAL DISC DRIVE

BACKGROUND OF THE INVENTION

The present invention relates to a head to be employed in an optical disc drive to read/write data from/to an optical disc.

Recently, technology in the field of magneto-optical disc drives has been greatly improved such that a data recording density on a magneto-optical disc has reached in excess of 10 Gbits/inch$^2$.

In such an optical disc drive, an objective optical system is mounted on an arm which is movable in a transverse direction of tracks formed on an optical disc for rough tracking. Firstly, the rough tracking is performed to locate the optical head in the vicinity of the track. Then, by changing incident angle of a beam which is incident on the objective optical system is controlled (i.e., a fine tracking is performed), with use of a galvano mirror or the like. During the fine tracking operation, the beam spot is accurately located on one of the tracks whose pitch is, for example, 0.34 $\mu$m. In order to control the galvano mirror to accurately perform the fine tracking, it is necessary to detect the amount of rotation of the galvano mirror.

Specifically, in a disc drive described above, if the deflection mirror is rotated to a position out of a certain rotational range to adjust the position of the beam spot, optical performance of the disc drive may be significantly lowered. Thus, the rotation angle of the deflection mirror should be monitored and controlled so as not to exceed a predetermined rotational range.

SUMMARY OF THE INVENTION

It is therefore an object of the invention to provide an improved head for an optical disc drive having a rotatable deflector, in which a rotation amount detection system is provided so that the tracking operation is performed accurately.

For the object, according to the invention, there is provided a head of an optical data recording/reproducing device, which is provided with: a laser source that emits a parallel laser beam; an objective optical system; a deflector rotatably provided between the laser source and the objective lens system, the laser beam emitted by the laser source being incident on the deflector and directed towards the objective optical system; a relay optical system provided between the deflector and the objective optical system, the relay optical system placing a position in the vicinity of a rotation axis of the deflector and a front principal plane of the objective lens to have a conjugate relationship; a detector provided between the deflector and the relay optical system, the detector having a first and a second light receiving portions and an opening, the two light receiving portions being arranged in a first direction in which the laser beam is deflected by the deflector, a part of the laser beam incident on the detector being received by the first and second light receiving portions, another part of the laser beam which passes through the opening being directed towards the objective lens through the relay optical system; and a controller that determines an amount of rotation of the deflector in accordance with amounts of light received by the two light receiving portions.

In one case, the first and second light receiving portions respectively include a first light receiving area and a second light receiving area. The first and second light receiving area and the opening are arranged along the first direction.

It is preferable that, at least in the first direction, a width of the opening is smaller than a length of a cross section of the laser beam incident on the detector.

Optionally, the opening may have a substantially circular shape.

Further optionally, the cross section of the laser beam incident on the detector may have a substantially elliptical shape having a longer axis in the first direction and a shorter axis in a second direction which is perpendicular to the first direction.

The longer axis of the elliptical shape should be greater than a diameter of the circular shape. It is preferable that the shorter axis of the elliptical shape is substantially the same as the diameter of the circular shape.

Still optionally, when the deflector is located at a predetermined position, the two light receiving areas receive the same amount of light.

In another case, the first light receiving portion may be provided with a first and a second light receiving areas, and the second light receiving portion comprises a third and fourth light receiving areas. In this case, the first and third light receiving areas are arranged in the first direction and provided on one side, in a second direction that is perpendicular to the first direction, of the opening, and the second and fourth light receiving areas are arranged in the first direction and provided on an opposite side, in the second direction, of the opening.

Optionally, the opening has a substantially rectangular shape, and the laser beam incident on the detector may have a substantially elliptical cross section which has a shorter axis in the first direction and a longer axis in the second direction.

In the above case, a width of the rectangular shape in the second direction should be smaller than the longer axis of the elliptical cross section of the laser beam.

Optionally, the width of the rectangular shape in the second direction may be substantially the same as a length of the shorter axis of the elliptical cross section of the laser beam.

In the above case, it is preferable that, when the deflector is located at a predetermined position, the first and third light receiving areas receive the same amount of light, and the second and fourth light receiving areas receive the same amount of light.

DESCRIPTION OF THE EMBODIMENTS

Hereinafter, the invention will be described with reference to the accompanying drawings.

Firstly, an optical disc drive to which the each of the embodiments is applicable will be described.

Figure 1:
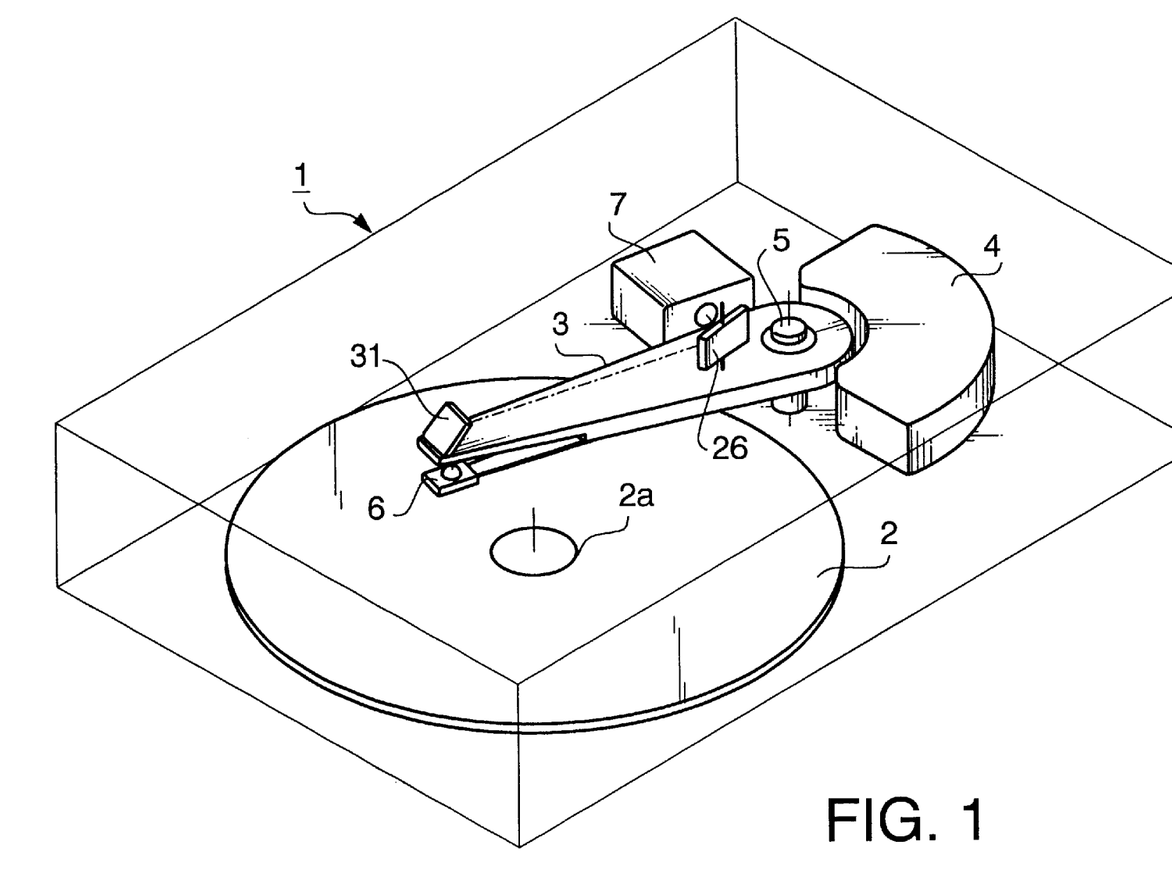
FIG. 1 is a perspective view of an optical disc drive to which first and the second embodiments of the present invention is embodied.

FIG. 1 is a perspective view of the optical disc drive (hereinafter, referred to as the disc drive) 1. The disc drive 1 is arranged to write and read data on an optical disc 2 by means of a so-called Near Field Recording (NFR) technology.

In the disc drive 1, the optical disc 2 is mounted to a rotating shaft 2a of a not-shown spindle motor. The disc drive 1 includes a rotary arm 3 extending in parallel to a surface of the optical disc 2, and is rotatably supported by a shaft 5. A floating head 6 that carries optical elements (described later) is provided to a tip of the rotary arm 3.

When the rotary arm 3 is rotated, the floating head 6 moves across tracks formed on the optical disc 2. The rotary arm 3 is further provided with a light source module 7 in the vicinity of the shaft 5.

Figure 2:
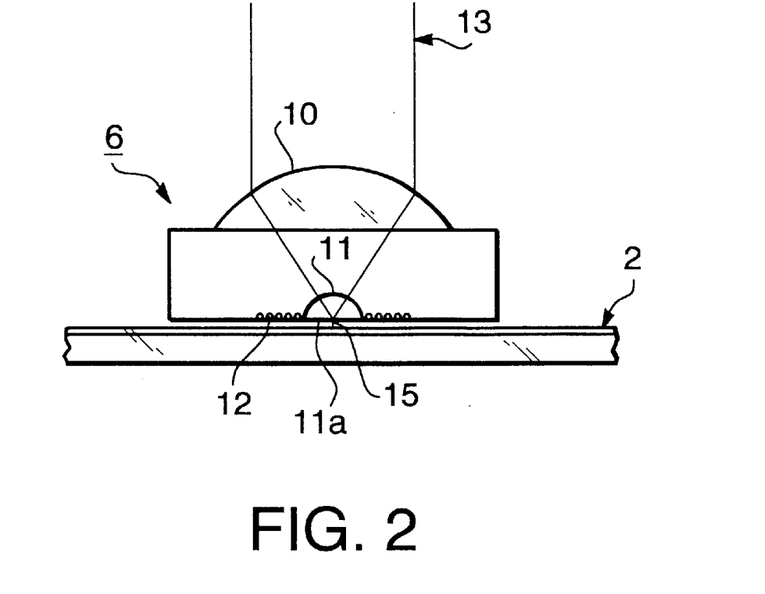
FIG. 2 is an enlarged view of a floating head of the optical disc drive of FIG. 1.
Figure 3:
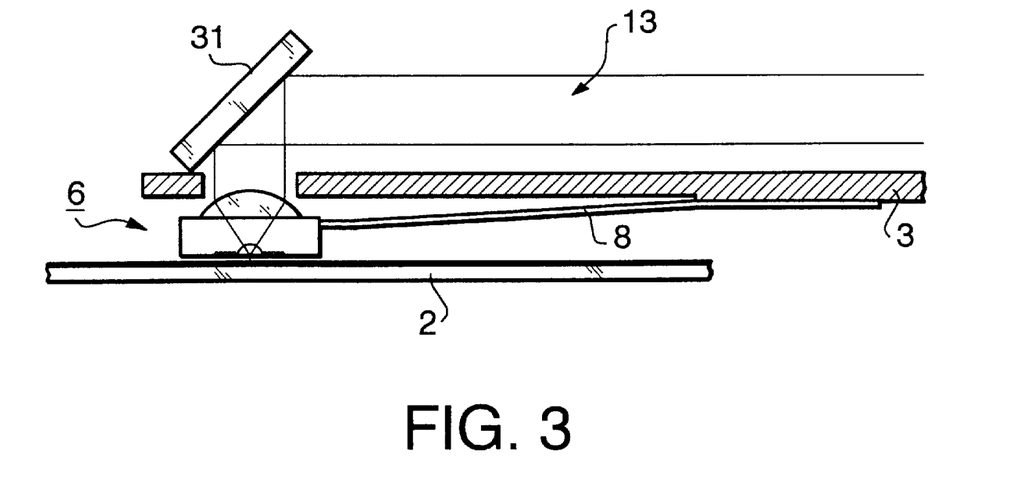
FIG. 3 is an enlarged view of the tip of the rotary arm of the optical disc drive of FIG. 1.

FIG. 2 is an enlarged view of the floating head 6. FIG. 3 is an enlarged view of the tip of the rotary arm 3. As shown in FIG. 3, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disc 2 rotates, the floating head 6 is lifted upward by air flow generated between the spinning optical disc 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflecting mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens and the plane surface thereof is faced with the optical disc 2. Further, the focal point of the objective lens 10 is positioned on the plane surface of the solid immersion lens 11. That is, the laser beam 13 is converged on the plane surface 11a of the solid immersion lens 11. Since the clearance of the optical disc and the plane surface 11a of the solid immersion lens 11 is less than 1 μm, the converged laser beam is converted to a so-called evanescent beam and reaches the optical disc 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68, 141–143 (1996), and U.S. Pat. No. 5,125,750 issued on Jun. 30, 1992, teachings of which are incorporated by reference in their entireties.

In order to apply magnetic field on the surface of the optical disc 2, a coil 12 is provided around the solid immersion lens 11. A current flow in the coil 12 generates a magnetic field in which the optical disc 2 is positioned. Data writing is performed by the evanescent beam from the solid immersion lens 11 and the magnetic field generated by the coil 12.

Figure 4:
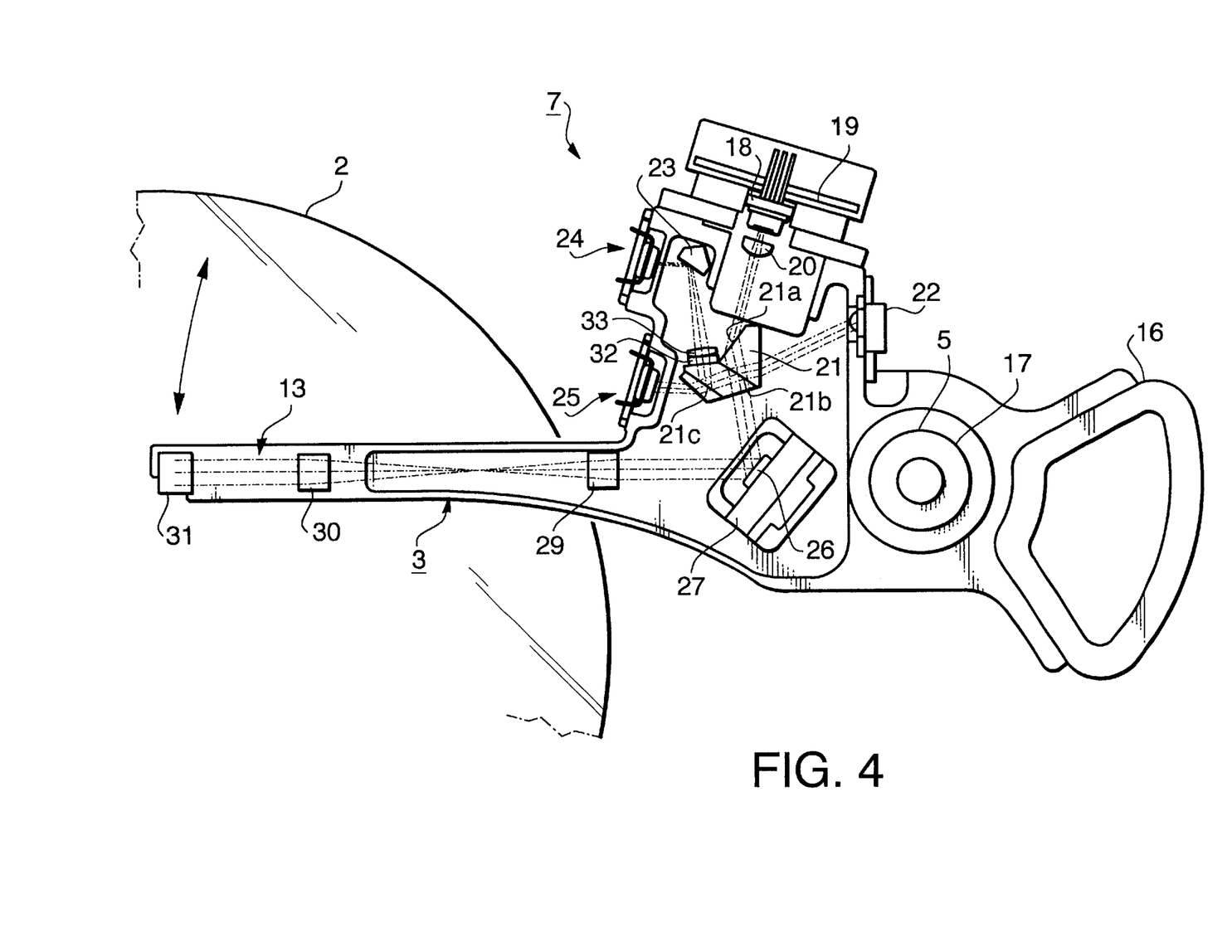
FIG. 4 is a top view of the rotary arm of the optical disc drive of FIG. 1.
Figure 5:
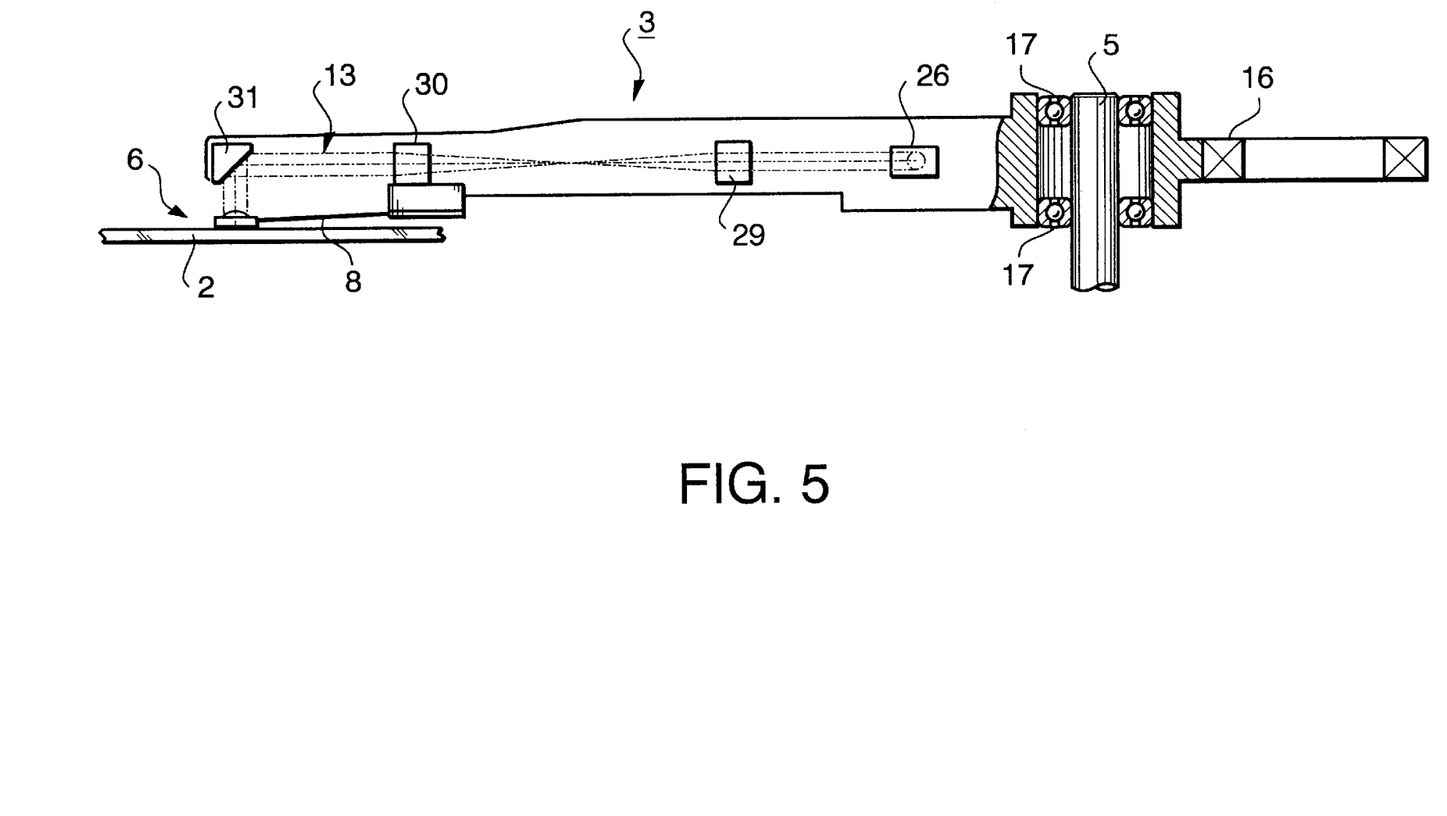
FIG. 5 is a longitudinal sectional view of the rotary arm of the optical disc drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam is changed. It should be noted that when the rotation amount detection system according to a first embodiment is to be employed, the sectional shape of the laser beam is made elliptical having a longer axis in a Y axis direction (see FIG. 7), while if a second embodiment is to be employed, the section shape of the laser beam is made elliptical having a longer axis in a Z axis direction (see FIG. 11). The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disc 2. For this purpose, a galvano mirror 26 is provided in a light path between the light source module 7 and the objective lens 10. In particular, the galvano mirror 26 is located so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disc 2. By rotating the galvano mirror 26, the incident angle of the laser beam 13 incident on the objective lens 10 is changed, so that the light spot on the optical disc 2 is moved. It should be noted that the rotation amount of the galvano mirror 26 is detected with use of a rotation amount detecting system, which is not shown in FIG. 4 and will be described as embodiments of the present invention later.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the objective lens 10 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely incident on the objective lens 10 irrespective of the rotation of the galvano mirror 26.

The laser beam 13 that has returned from the surface of the optical disc 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disc 2. In particular, the data signal from the tracking detection sensor 25 and data detection sensor 24 are generated by a not-shown amplifier circuit and sent to a not-shown control circuit.

Hereinafter, with reference to FIGS. 6–14, rotation amount detecting systems applicable to the above-described optical disc drive will be explained.

First Embodiment

FIGS. 6–9 are drawings illustrating a rotation amount detecting system 100 according to a first embodiment of the invention.

Figure 6:
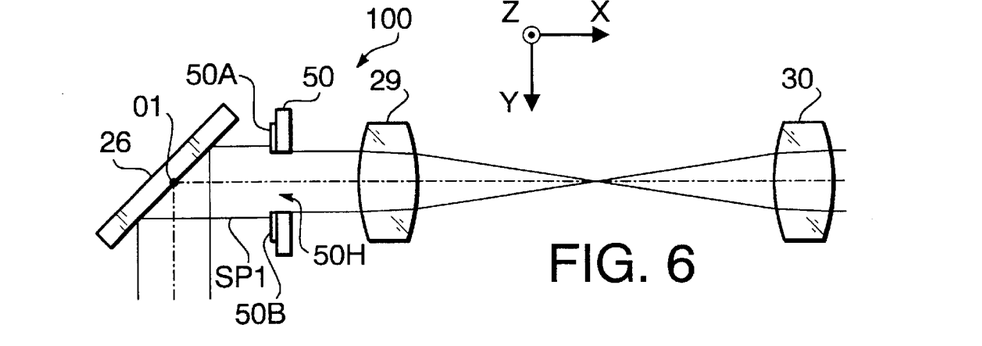
FIG. 6 shows a structure of a rotation amount detecting system according to a first embodiment of the invention.
Figure 7:
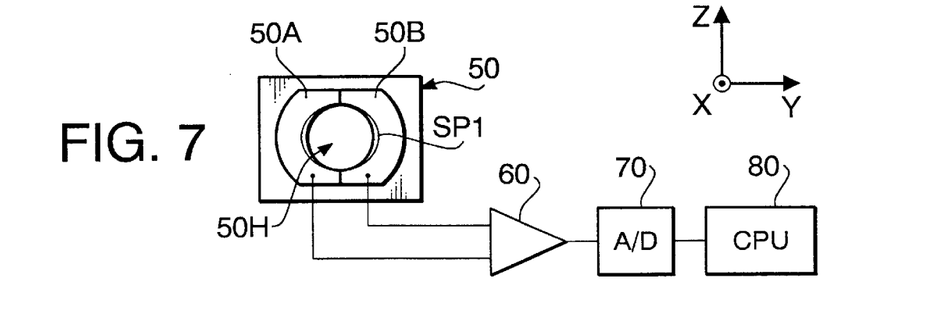
FIG. 7 shows a positional relationship between a beam spot and light receiving areas of a detector.

FIG. 6 shows a case where the galvano mirror 26 is located at a reference position, or a neutral position. In this case, the central ray of the beam coincides with the optical axis of the optical system. FIG. 7 shows a structure of a sensor viewed from the galvano mirror side. In order to simplify the description, a three-dimensional coordinate system is defined as illustrated in FIG. 6. The laser beam is incident on the galvano mirror along the X axis. When the galvano mirror 26 is located at the reference position, the beam incident on the galvano mirror 26 is reflected and proceeds in the X direction. The galvano mirror 26 is rotatable about an axis 01 which extends in the Z direction. Thus, when the galvano mirror 26 rotates, the reflected beam is deflected on the X-Y plane.

When the rotation amount detecting system 100 is employed, the cross section of the laser beam emerged from the composite prism assembly 21 is made elongated in the X axis direction.

As shown in FIG. 6, a detector 50 is provided between the galvano mirror 26 and the first relay lens 29. The detector 50 has at least two light receiving areas 50A and 50B, as shown in FIG. 7, which are arranged in Y axis direction. At a central portion of the detector, a circular opening 50H is formed. A diameter of the circular opening 50H is substantially the same as the shorter axis of the cross section of the laser beam. The detector 50 is arranged such that, when the galvano mirror 26 is located at the reference position as shown in FIG. 6, the center of the laser beam reflected by the galvano mirror 26 passes through the center of the opening 50H.

As described above, the longer axis, which extends in the Y axis direction, of the cross section of the laser beam incident on and reflected by the galvano mirror 26 is longer than the diameter of the opening 50H. Specifically, the longer axis of the cross section of the reflected laser beam extends in the Y axis direction, and accordingly, peripheral portions in the Y axis direction of the laser beam SP1 are received by the light receiving areas 50A and 50B, respectively, as shown in FIG. 7. If the galvano mirror 26 is rotated and displaced from the reference position, the reflected laser beam moves in the Y axis direction, and amounts of light received by the light receiving areas 50A and 50B change. Accordingly, by detecting a difference between the amounts of light received by the light receiving areas 50A and 50B, an amount of movement of the beam spot on the detector 50 can be detected. Thus, based on the amount of movement of the beam spot on the detector 50, the rotation amount of the galvano mirror 26 can be obtained. For this purpose, the light receiving areas 50A and 50B are connected to a differential amplifier 60. The light receiving areas 50A and 50B respectively outputs signals corresponding to the received amounts of light. The differential amplifier 60 outputs a signal representing the difference between the amounts of light received by the light receiving areas 50A and 50B. The output of the differential amplifier 60 is input, via an A/D converter 70, to a CPU (Central Processing Unit) 80 which calculates the rotation amount of the galvano mirror in accordance with the output value of the differential amplifier 60.

On the other hand, the portion of the laser beam passed through the opening 50H is incident, via the first and second relay lenses 29 and 30 and the reflection mirror 31, on the objective lens 10 as a beam having a circular cross section. It should be noted that, since the position in the vicinity of the rotation axis 01 of the galvano mirror 26 and the principal plane of the objective lens have a conjugate relationship, when the galvano mirror 26 is rotated, the laser beam passed through the opening 50H is incident substantially at the same position of the objective lens 10, but at different incident angles.

Figure 8:
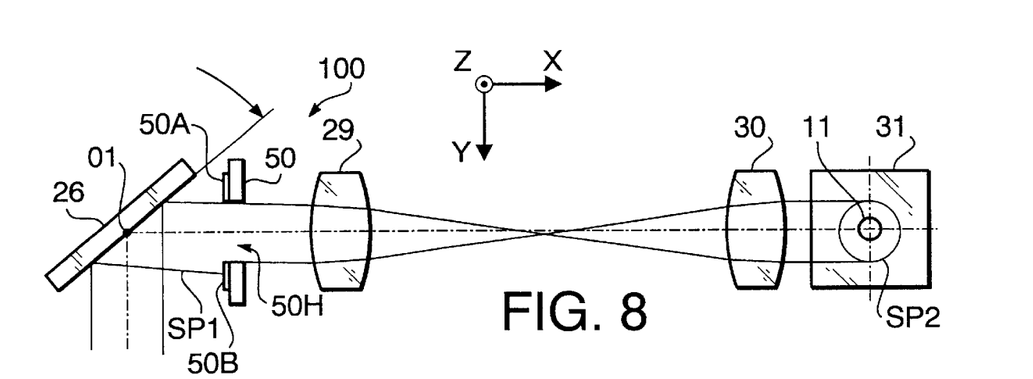
FIG. 8 is a view similar to FIG. 6 except that the galvano mirror has been rotated.
Figure 9:
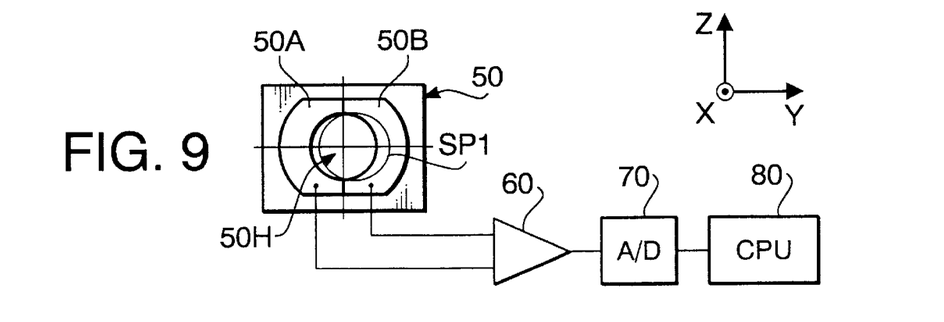
FIG. 9 shows a positional relationship between the beam spot and the light receiving areas when the galvano mirror is rotated.

FIGS. 6 and 7 show a case where the galvano mirror 26 is located at the reference position and the laser beam is incident on the reflection surface of the galvano mirror 26 at an incidence angle of 45 degrees. In this case, the light receiving areas 50A and 50B receive the same amount of light. If the galvano mirror 26 is rotated in a clockwise direction, then the laser beam moves in the Y axis direction as shown in FIGS. 8 and 9. That is, the light receiving areas 50A and 50B receive different amounts of light. Based on the difference between the amounts of light received by the light receiving areas 50A and 50B, the amount of rotation of the galvano mirror 26 can be known.

As described above, according to the first embodiment of the invention, the rotation amount of the galvano mirror 26 can be obtained with a relatively simple structure.

Figure 14:
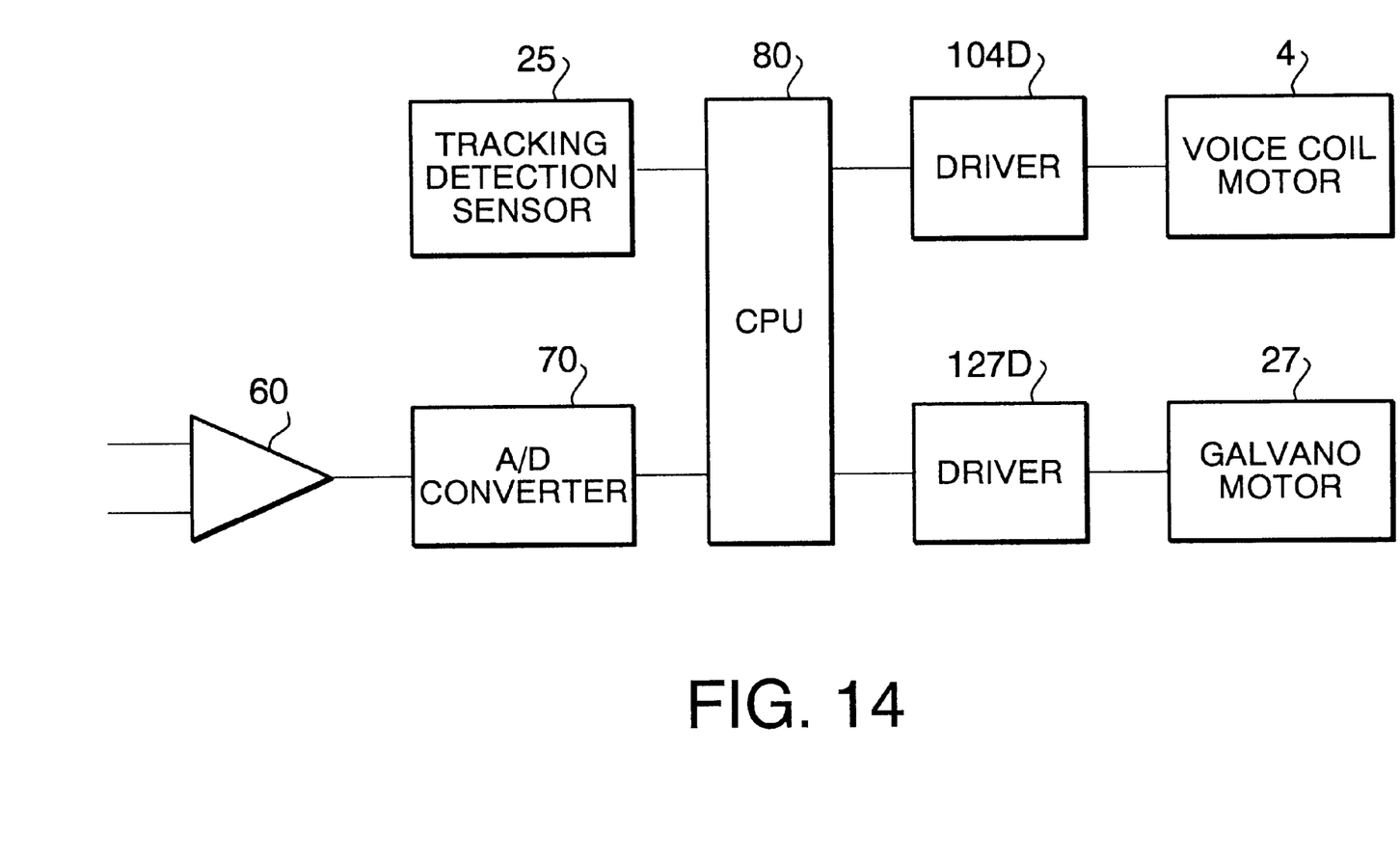
FIG. 14 is a block diagram illustrating a control system for executing a tracking operation.

FIG. 14 is a block diagram illustrating a control system for executing the tracking operation. As described above, the output signal of the differential amplifier 60 is transmitted, via the A/D converter, to the CPU 80, which detects the rotational position of the galvano mirror 26. Based on the detected rotational position of the galvano mirror 26 and the tracking error signal output by the tracking detection sensor 25, the CPU 80 calculates a resultant rotational position, which represents a rotational position of the galvano mirror 26 after it is rotated to adjust the position of the beam spot.

If the resultant rotational position is within a predetermined allowable rotation range, the CPU 80 controls a driver 127D of the galvano motor 27 to rotate the galvano mirror 26 such that the beam spot is directed on a desired one of the tracks of the optical disc 2 accurately. If the resultant rotational position of the galvano mirror 26 is out of the predetermined allowable rotation range, the CPU 80 converts the resultant rotational position into an amount of movement of the rotary arm 3, and controls a driver 104D of the voice coil motor 4 to rotate the rotary arm 3 instead of rotating the galvano mirror 26. As a result of movement of the rotary arm 3, the beam spot is located on the desired track and the galvano mirror 26 is located at the neutral position, i.e., a center of the allowable rotational range. Thereafter, if necessary, a further fine tracking operation for locating the beam spot accurately on the desired track may be executed.

Second Embodiment

FIGS. 10–13 are drawings illustrating a rotation amount detecting system 200 according to a second embodiment of the invention.

Figure 10:
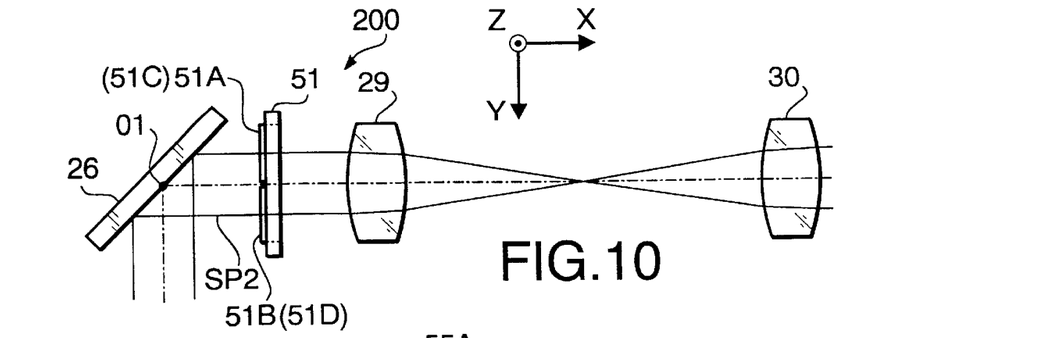
FIG. 10 shows a structure of the rotation amount detecting system according to a second embodiment of the invention.
Figure 11:
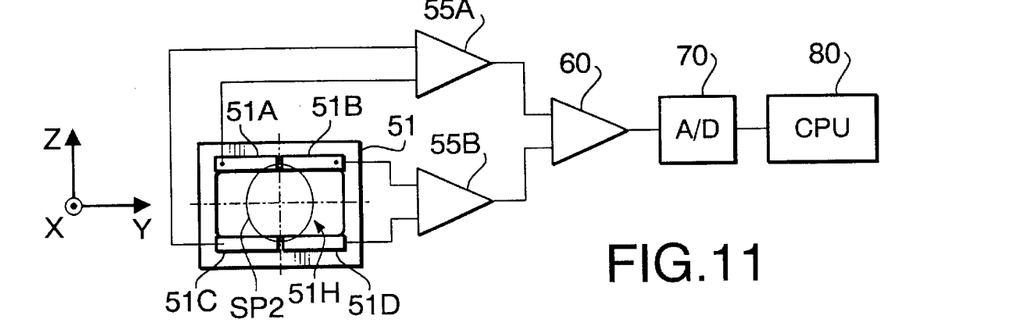
FIG. 11 shows a positional relationship between a beam spot and light receiving areas of a detector.

FIG. 10 shows a case where the galvano mirror 26 is located at a reference position. In this case, the central ray of the beam coincide s with the optical axis of the optical system. FIG. 11 shows a structure of a detector 51 viewed from the galvano mirror side. Similar to the first embodiment, a three-dimensional coordinate system is defined as illustrated in FIG. 10. The laser beam is incident on the galvano mirror along the X axis. When the galvano mirror 26 is located at the reference position, the beam incident on the galvano mirror 26 is reflected and proceeds in the X direction. The galvano mirror 26 is rotatable about an axis 01 which extends in the Z direction. Thus, when the galvano mirror 26 rotates, the reflected beam is deflected on the X-Y plane.

When the rotation amount detecting system 200 is employed, the cross section of the laser beam emerged from the composite prism assembly 21 is made elongated in the Z axis direction.

As shown in FIG. 10, a detector 51 is provided between the galvano mirror 26 and the first re lay lens 29. The detector 51 has at least four light receiving areas 5A–51D, as shown in FIG. 11. The light receiving areas 51A and 51B are arranged in the Y axis direction. The light receiving areas 51A and 51B are arranged in the Y axis direction, and light receiving areas 51C and 51D are also arranged in the Y axis direction. The light receiving areas 51A and 51C, and the light receiving areas 51B and 51D are respectively arranged in the X axis direction with an opening formed therebetween. As shown in FIG. 11, a rectangular opening 51H is formed between the light receiving areas 51A and 51B, and 51C and 51D. A length of the opening 51H in the Z axis direction is substantially the same as the shorter axis of the cross section of the laser beam (i.e., the length of the opening in the Z axis direction is shorter than the longer axis of the cross section of the laser beam). The detector 51 is arranged such that, when the galvano mirror 26 is located at the reference position as shown in FIG. 10, the center of the laser beam SP2 reflected by the galvano mirror 26 passes through the center of the opening 51H.

As described above, the longer axis, which extends in the Z axis direction, of the cross section of the laser beam incident on and reflected by the galvano mirror 26 is longer than the length in the Z axis direction of the opening 51H. If the galvano mirror 26 is located at the reference position as shown in FIG. 10, the light receiving areas 51A and 51B receive the same amounts of light. Similarly, the light receiving areas 51C and 51D receive the same amounts of light.

If the galvano mirror 26 is rotated and displaced from the reference position, the reflected laser beam SP2 moves in the Y axis direction, and amounts of light received by the light receiving areas 50A and 50B change. Similarly, the light receiving areas 50C and 50D receives different amounts of light. Accordingly, by detecting a difference between the amounts of light received by the light receiving areas 51A and 51C, and the amounts of light received by the light receiving areas 51B and 51D, an amount of movement of the beam spot on the detector 51 can be detected. Thus, based on the amount of movement of the beam spot on the detector 51, the rotation amount of the galvano mirror 26 can be obtained.

For this purpose, the light receiving areas 51A and 51C are connected to a first adder 55A, and the light receiving areas 51B and 51D are connected to a second adder 55B. Further, the first adder 55A and the second adder 55B are connected to the differential amplifier 60. The light receiving areas 51A–51D respectively output signals corresponding to the received amounts of light. The first adder 55A outputs a signal representing the sum of amounts of light received by the light receiving areas 51A and 51C, and the second adder 55B outputs a signal representing the sum of amounts of light received by the light receiving areas 51B and 51D. Thus, the differential amplifier 60 outputs a signal representing the difference between the amounts of light received by the light receiving areas 51A and 51C, and the amounts of light received by the light receiving areas 51B and 51D. Similarly to the first embodiment, the output of the differential amplifier 60 is input, via the A/D converter 70, to the CPU (Central Processing Unit) 80 which calculates the rotation angle of the galvano mirror in accordance with the output value of the differential amplifier 60.

On the other hand, the portion of the laser beam passed through the opening 51H is incident, via the first and second relay lenses 29 and 30 and the reflection mirror 31, on the objective lens 10. Since the length of the opening 51H in the Z axis direction is substantially the same as the shorter axis of the cross section of the laser beam SP2, the portion of the beam passed through the opening is incident on the objective lens as a beam having a substantially circular cross section.

Figure 12:
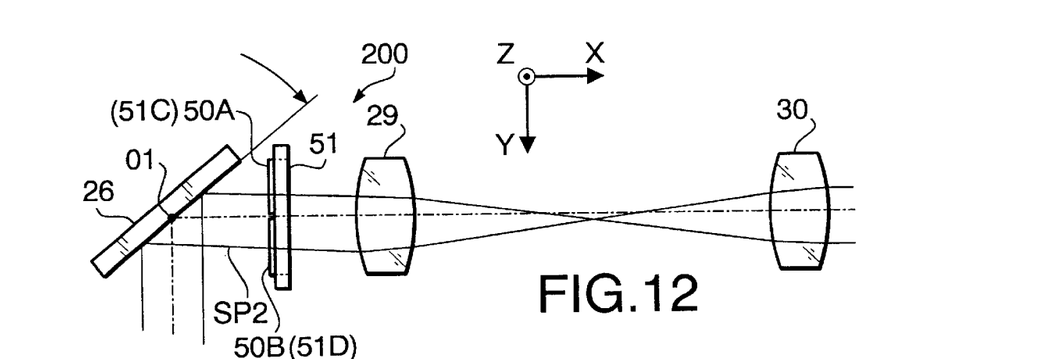
FIG. 12 shows how the beam proceeds when the galvano mirror is rotated.
Figure 13:
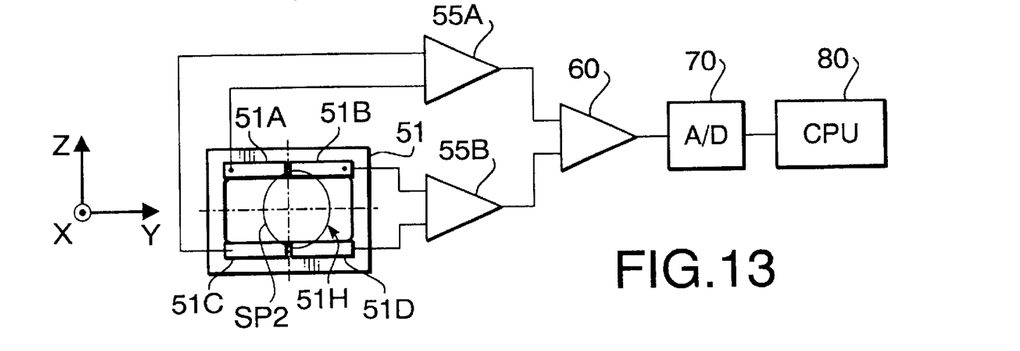
FIG. 13 shows a positional relationship between the beam spot and the light receiving areas when the galvano mirror is rotated.

FIGS. 10 and 11 show a case where the galvano mirror 26 is located at the reference position and the laser beam is incident on the reflection surface of the galvano mirror 26 at an incidence angle of 45 degrees. In this case, the light receiving areas 51A and 51B, and the light receiving areas 51C and 51D respectively receive the same amount of light. If the galvano mirror 26 is rotated, for example, in a clockwise direction, then the laser beam moves in the Y axis direction as shown in FIGS. 12 and 13. In this case, the light receiving areas 51A and 51B receive different amounts of light, and the light receiving areas 51C and 51D receive different amounts of light. Based on the difference between the sum of the amounts of light received by the light receiving areas 51A and 51C, and the sum of the amounts of light received by the light receiving areas 51B and 51D, the amount of rotation of the galvano mirror 26 can be known.

It should be noted that the control system shown in FIG. 14 is applicable when the second embodiment is employed instead of the first embodiment.

As described above, according to the second embodiment of the invention, the rotation amount of the galvano mirror 26 can be obtained with a relatively simple structure.

The present disclosure relates to subject matters contained in Japanese Patent Applications Nos. HEI 09-309864 and HEI 09-309865, filed on Oct. 24, 1997, which are expressly incorporated herein by reference in their entireties.

What is claimed is:

1. A head of an optical data recording/reproducing device, comprising:

a laser source that emits a parallel laser beam;

an objective optical system;

a deflector rotatably provided between said laser source and said objective lens system, the laser beam emitted by said laser source being incident on said deflector and directed towards said objective optical system;

a relay optical system provided between said deflector and said objective optical system, said relay optical system placing a position in the vicinity of a rotation axis of said deflector and a front principal plane of said objective lens to have a conjugate relationship;

a detector provided between said deflector and said relay optical system, said detector having a first and a second light receiving portions and an opening, said two light receiving portions being arranged in a first direction in which the laser beam is deflected by said deflector, a part of the laser beam incident on said detector being received by said first and second light receiving portions, another part of the laser beam which passes through said opening being directed towards said objective lens through said relay optical system; and a controller that determines an amount of rotation of said deflector in accordance with amounts of light received by said two light receiving portions.

2. The head according to claim 1, wherein said first and second light receiving portions respectively include a first light receiving area and a second light receiving area, said first and second light receiving area and said opening being arranged along said first direction.

3. The head according to claim 2, wherein, at least in said first direction, a width of said opening is smaller than a length of a cross section of the laser beam incident on said detector.

4. The head according to claim 3, wherein said opening has a substantially circular shape.

5. The head according to claim 4, wherein the cross section of said laser beam incident on said detector has a substantially elliptical shape having a longer axis in said first direction and a shorter axis in a second direction which is perpendicular to said first direction.

6. The head according to claim 5, wherein the longer axis of said elliptical shape is greater than a diameter of said circular shape and the shorter axis of said elliptical shape is substantially the same as the diameter of said circular shape.

7. The head according to claim 6, wherein when said deflector is located at a predetermined position, said two light receiving areas receive the same amount of light.

8. The head according to claim 1, wherein said first light receiving portion comprises a first and a second light receiving areas, wherein said second light receiving portion comprises a third and fourth light receiving areas, said first and third light receiving areas being arranged in said first direction and provided on one side, in a second direction that is perpendicular to said first direction, of said opening, said second and fourth light receiving areas being arranged in said first direction and provided on an opposite side, in said second direction, of said opening.

9. The head according to claim 8, wherein said opening has a substantially rectangular shape, wherein the laser beam incident on said detector has a substantially elliptical cross section which has a shorter axis in said first direction and a longer axis in said second direction.

10. The head according to claim 9, wherein a width of said rectangular shape in said second direction is smaller than the longer axis of said elliptical cross section of the laser beam.

11. The head according to claim 10, wherein the width of said rectangular shape in said second direction is substantially the same as a length of the shorter axis of said elliptical cross section of the laser beam.

12. The head according to claim 8, wherein when said deflector is located at a predetermined position, said first and third light receiving areas receive the same amount of light, and said second and fourth light receiving areas receive the same amount of light.

* * * * *